Dec. 17, 1935.  G. V. CURTIS  2,024,912
UNIVERSAL JOINT
Filed June 5, 1935  2 Sheets-Sheet 1
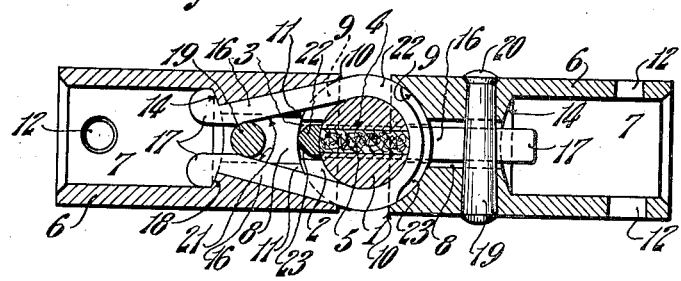
INVENTOR,
George V. Curtis,
BY Harry W. Bowen,
ATTORNEY.

Dec. 17, 1935.        G. V. CURTIS        2,024,912
UNIVERSAL JOINT
Filed June 5, 1935        2 Sheets-Sheet 2
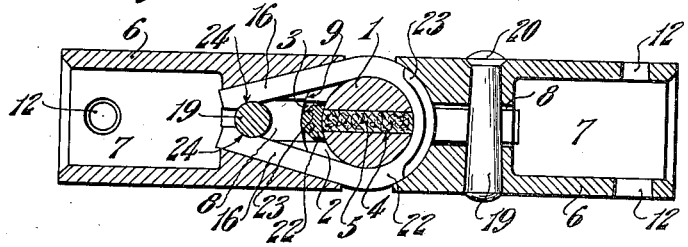
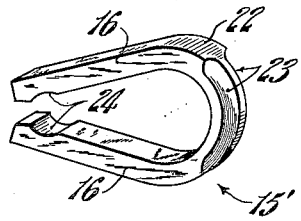
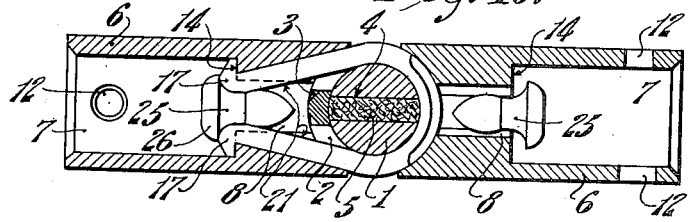
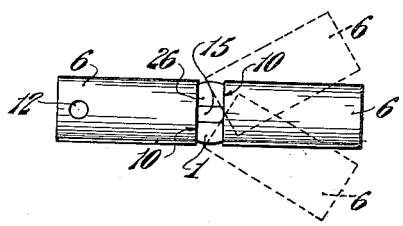
INVENTOR,
George V. Curtis,
BY
Harry W. Bowen.
ATTORNEY.

Patented Dec. 17, 1935

2,024,912

UNITED STATES PATENT OFFICE 2,024,912

UNIVERSAL JOINT

George V. Curtis, West Springfield, Mass.

Application June 5, 1935, Serial No. 25,105

7 Claims. (Cl. 64—16)

My invention relates to improvements in universal joints.

An object of my invention is to provide a universal joint construction which will combine a maximum—of strength, simplicity of construction and assembly and economy in manufacture.

Many of the universal joints now in use are faulty in construction, in that the connecting members are weakened by being bored for the insertion of locking members, such as tapered pins, by means of which these connecting members are secured to the couplings of the joint.

It is a further object of this invention to eliminate the boring or drilling of these connecting members, thereby providing the full cross section of the material throughout the structure.

These, and other objects and advantages of my invention, will be more completely and specifically described and disclosed in the following specification, the accompanying drawings, and the appended claims.

Broadly, my invention comprises a spherical member formed with annular grooves having the plane of their axes perpendicular to each other, a pair of coupling members, substantially U-shaped, connecting members that are rotatably secured in the annular grooves of the spherical member and located in each of the coupling members of the joint, and means for locking, or securing, the U-shaped connecting members in engaged relation with the coupling members, without the necessity of piercing, or weakening, the connecting members, in any way.

A preferred embodiment of my invention is illustrated in the accompanying drawings, in which:—

Fig. 1 is a longitudinal, sectional view of the assembled universal joint.

Fig. 2 is a perspective view of one of the connecting members, shown in Fig. 1.

Fig. 3 is an elevational view of the central, spherical member, showing the two annular grooves therein.

Fig. 4 is a sectional view on the line 4—4 of Fig. 3.

Fig. 5 is a sectional view of one of the coupling members.

Fig. 6 is an end view of the coupling member, looking from the right of Fig. 5.

Fig. 7 is an opposite, end view of the coupling member, looking from the left of Fig. 5.

Fig. 8 is a view similar to Fig. 1, illustrating a modified form of universal joint, with the parts assembled.

Fig. 9 is a perspective view of the U-shaped connecting member, shown in Fig. 8.

Fig. 10 is a view, similar to Fig. 1, illustrating a further modified form of universal joint, with the parts assembled.

Fig. 11 is a detail view of the locking pin, for the U-shaped connecting member, used in the construction shown in Fig. 10, and Fig. 12 is a diagrammatic view, illustrating the rigid construction and adaptability of my universal joint.

Referring now to the drawings in detail, in which like numerals refer to like parts throughout:

A spherical member 1 is formed with annular grooves 2 and 3, having the planes of their axes perpendicular to each other, and an axial bore 4, which may be packed with a lubricating substance 5, as raw wool.

Oppositely located coupling members 6 are each provided with an axial bore 7 in one end for receiving a shaft (not shown), which extends partially through the member 6, and, a second, smaller, axial bore 8, connecting with the first bore 7 and terminating in a curved seat, or recess 9, formed in the opposite end 10, of the coupling member 6, and having the same radius as the spherical member 1. A tapered slot 11 is formed in the coupling members 6, communicating with the curved recess 9 and the bore 7. The coupling members 6 are each drilled at 12 to receive taper pins for securing a shaft, (not shown) to the coupling members 6. The members 6 are also drilled at 13 to receive taper pins, the purpose of which will be described. At the intersection of the bores 7 and 8, and tapered slot 11, an annular shoulder 14 is formed in the member 6.

Two substantially U-shaped members 15, one of which is shown in detail, in Fig. 2, having converging leg portions 16 terminating in hooked end portions 17, are rotatably engaged in the annular grooves 2 and 3 of the member 1 and fixedly engaged in the tapered slots 11 of the couplings 6 with faces 18 of the hooked end portions 17 in engagement with the annular shoulder 14. In assembling, the U-shaped members 15 are pushed into the tapered slots 11, the leg portions 16 closing toward each other to permit the hooked end portions 17 to pass through the tapered slot 11, there being sufficient spring, or resiliency, in the member 15, to force the ends 17 outwardly into engagement with the annular shoulder 14, as soon as they are free to do so. A tapered pin 19 is then inserted in the opening 13 and headed over at 20, to prevent its accidental removal. The pin 19 engages against the inner surfaces 21 of the legs 16 and thereby locks the U-shaped member 15 in position and prevents withdrawal of the same from the coupling 6. The curved portion 22 of the member 15 is chamfered at 23 to provide a maximum angular movement of the member 6, relative to each other, as indicated in Fig. 12.

In the modified construction, illustrated in Figs. 8 and 9, the U-shaped member 15' is formed with opposed recesses 24 in the leg portions 16 with which the tapered pin 19 engages, to prevent withdrawal of the connecting members 15' from the couplings 6.

In the construction, illustrated in Figs. 10, 11, and 12, a locking pin 25 is forcibly inserted between the hooked end portions 17 of the two U-shaped members 15, to engage against the surfaces 14 and prevent withdrawal of these members, 15, from the couplings 6. The pin 25 is provided with a head portion 26 which bears against the ends of the hooks 17, a slightly contracted cylindrical portion 27, and a swelled portion 28, terminating in a point 29. The swelled portion 28, after being forced by the ends 17 of the member 15, securely locks the pin 25 in a position against removal.

As shown in Fig. 12, the construction illustrated in the drawings and described in this specification provides a universal joint, which requires a very small gap 26, between the ends 10 of the members 6, and yet permits a wide angular movement of the couplings 6, relative to each other, as shown by the dotted lines.

From this construction, it will be seen that I have produced a universal joint construction that is simple in construction, efficient in operation, and one that is rigid when in use, and effectually removes practically all lost motion between the moving parts, which is an important feature.

What I claim is:—

1. In combination, in a universal joint construction, coupling members, each having an opening in an end to receive a shaft, a ball member between the coupling members having annular grooves, a U-shaped member with converging arms and hook end portions on the arms located in each groove, a shoulder portion on the coupling members engaged by the said hook ends of the arms, and means for retaining the hook ends of the arms on the said shoulders.

2. In combination, in a universal joint construction, coupling members, each having an opening in an end to receive a shaft, a ball member between the coupling members having annular grooves, a U-shaped member with converging arms and hook end portions on the arms located in each groove, a shoulder portion on the coupling members engaged by the said hook ends of the arms, and means for retaining the hook ends of the arms on the said shoulders, said means comprising a pin located in the coupling members and between the converging arms.

3. In a universal joint construction, coupling members, each having a curved recess and an axial opening terminating in the recess, there being inclined slots in the coupling members terminating in shoulders, a spherical member with annular grooves located in the said recess, members with hooked ends located in the annular grooves of the spherical member and also in the inclined slots and their hooked ends engaging the shoulders of the coupling members, and means for retaining the hooked ends on the shoulders.

4. In a universal joint construction, coupling members each having a curved recess and an axial opening terminating in the recess, there being inclined slots in the coupling members terminating in shoulders, a spherical member with annular grooves located in the said recess, members with hooked ends located in the annular grooves of the spherical member and also in the inclined slots and their hooked ends engaging the shoulders of the coupling members, and means for retaining the hooked ends on the shoulders, said means comprising a pin engaging the said members for forcing the said members into the inclined slots.

5. In a universal joint construction, coupling members each having a spherical recess and an annular shoulder, a spherical member having annular grooves and located in the said recess, U-shaped members in said grooves and having offset ends engaging the annular shoulders, pins engaging the arms of the U-shaped members for retaining the offset ends on the annular shoulders.

6. In a universal joint construction, coupling members each having a spherical recess and an annular shoulder, a spherical member having annular grooves in the said recess, U-shaped members in said grooves and having offset ends engaging the annular shoulders, pins engaging the arms of the U-shaped members for retaining the offset ends on the annular shoulders, the U-shaped members having chamfered portions for determining the angular relation of the couplings, when in use.

7. In a universal joint construction, coupling members, each having a spherical recess and an annular shoulder, a spherical member having annular grooves in the said recess, U-shaped members in said grooves and having offset ends engaging the annular shoulders, pins engaging the arms of the U-shaped members for retaining the offset ends on the annular shoulders, the U-shaped members having chamfered portions for determining the angular relation of the couplings, when in use, there being inclined, or tapered slots, in the coupling members in which the arms of the U-shaped members are located, whereby the pins will operate to hold the arms seated in the said slots.

GEORGE V. CURTIS.